United States Patent [19]

Bona

[11] Patent Number: 4,664,425
[45] Date of Patent: May 12, 1987

[54] PIPE-FLANGE COUPLING WITH IRREVERSIBLE SCREWING AT ROTATION

[75] Inventor: Alfredo D. Bona, Abbiategrasso, Italy

[73] Assignee: Murray Europe S.p.A., Milan, Italy

[21] Appl. No.: 872,980

[22] Filed: Jun. 11, 1986

[30] Foreign Application Priority Data

Dec. 12, 1985 [IT] Italy .............................. 24139/85[U]

[51] Int. Cl.⁴ ............................................ F16L 25/00
[52] U.S. Cl. .................................. 285/330; 285/342; 285/356; 285/363
[58] Field of Search ............ 285/353, 356, 330, 332.2, 285/332.3, 342, 363

[56] References Cited

U.S. PATENT DOCUMENTS 2,314,867 3/1943 Boynton ........................... 285/330 X
2,560,263 7/1951 Wiegand et al. ................. 285/356 X
2,983,506 5/1961 Bertsch et al. .................. 285/356 X

FOREIGN PATENT DOCUMENTS 2030644 1/1971 Fed. Rep. of Germany ...... 285/356
781227 5/1935 France ............................... 285/356

Primary Examiner—Dave W. Arola
Attorney, Agent, or Firm—Bucknam and Archer

[57] ABSTRACT

The pipe (2) is inserted in the through-hole of the flange (1) and the pipe-flange seal is assured by a fixing ring nut (6) screwed into the upper portion (5) of the hole.

The hole, in the part opposite the threaded area (5), has an area (4) with a diameter equal to that of the pipe (2) and a truncated-cone coupling area (4) between the two areas (5) and (7). A ring (8) of elastomeric material is inserted inside the truncated-cone portion (7) and an annular projection (9) on the pipe (2) acts thereon, pushed by the screwing action of the ring nut (6).

1 Claim, 2 Drawing Figures

U.S. Patent  May 12, 1987  4,664,425
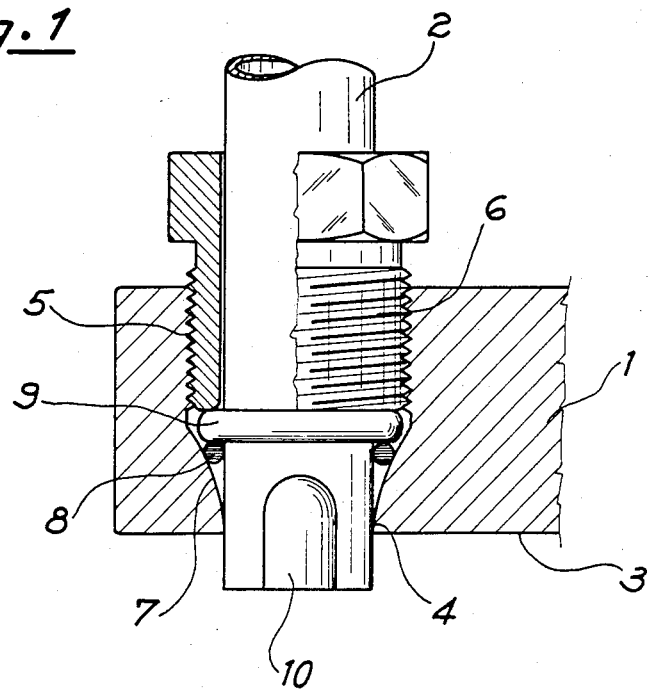
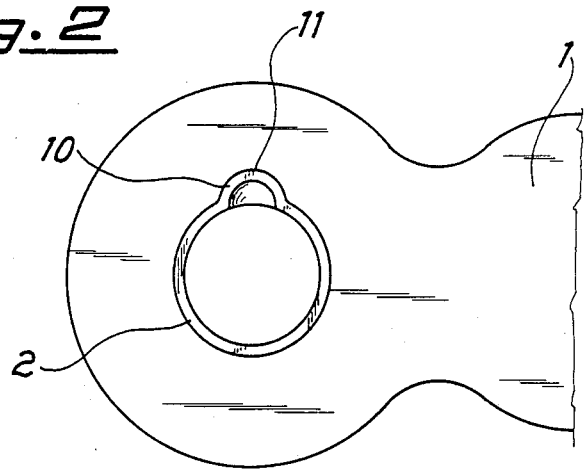

PIPE-FLANGE COUPLING WITH IRREVERSIBLE SCREWING AT ROTATION

BACKGROUND OF THE INVENTION

FIELD OF THE INVENTION

This invention refers to a pipe-flange coupling, via irreversible screwing at rotation.

More in particular, this invention refers to a pipe-flange coupling via irreversible screwing at rotation, particularly suited to being used in pressurized fluid circuits, subject to vibration, as for example in air compressors, or air conditioners mounted on vehicles.

In pipe-flange couplings where a leak-proof seal is required that is stable in time and can withstand vibrations at any frequency, as occurs for example in the compressor circuits of car air conditioners, the present state of the art requires that the components be welded.

This welding operation, particularly in the case of aluminium, or light alloy cast pipes, involves considerable problems in executing the weld and significant difficulties to ensure that a reliable coupling is achieved.

The most frequent drawbacks are: sagging and burrs on the seal surface; burns, or porosity in the weld caused by the use of deoxidisers; annealing of the base materials with a weakening of the structural rigidity and of the toughness of the materials themselves, etc. In addition, during operation the inevitable prolonged stress, due to the vibrations, may crack a layer of the melted material, breaking the seal.

This invention overcomes all the above mentioned drawbacks, achieving the pipe-flange coupling by screwing a fixed ring nut which maintains the pipe fixed in a corresponding hole of the flange and rotation of the pipe in the opposite sense, due to the vibrations is prevented.

According to this invention, the flange-through hole inside with the pipe is fixed includes, in the internal part opposite the fixing part, a portion with a diameter equal to the outside diameter of the pipe and in the external part, corresponding to the fixing part, a threaded portion to screw the fixing ring nut; the two internal and external portions being connected to one another by an intermediate area having a longitudinal section (along the screwing axis) which essentially has a truncated-cone shape.

The pipe has an annular projection on its surface into which the fixing ring nut engages. A ring of elastomeric material is inserted inside the pipe, beneath the annular projection and in contrast between the projection and the surface of the truncated-cone area of the hole.

In addition, the terminal part of the pipe has a cupped, or enlarged portion with an essentially cylindrical shape which inserts itself in a corresponding complementary recess made in the flange section, within and downstream of the truncated-cone seat.

Insertion of the enlarged part into a recess prevents the formation of a torsional torque exerted on the ring nut due to the vibrations which cause loosening of the threaded part.

In addition, the thrust, exerted by the split ring deformed by the pressure of the annular projection maintains the ring nut in elastic contact with an axial braking effect on the threads.

In this way a solid coupling is formed and without the possibility of rotation.

To better understand this invention, the said invention will be described in greater detail here with the help of the drawings which represent a preferred, illustrative, but non-limitative embodiment thereof.

FIG. 1 represents the schematic view of the cross-section, obtained with a plane passing through the axis of the pipe, of a general flange to which a pipe is fixed with a leak-proof seal, in accordance with this invention.

FIG. 2 represents the schematic view from below FIG. 1, in correspondence to the sealing section of the pipe with the flange.

The figures illustrate a general flange 1, with a through-hole, where a pipe 2 is fixed in a leak-proof coupling about its perimeter, the pipe 2 projects from the sealing surface 3 of the flange.

The hole includes an area 4, in correspondence with the sealing surface 3, virtually the one facing inwards, having a diameter equal to the outside diameter of the pipe 2 and in correspondence with the part facing outwards, i.e. the fixing part, and along the same axis of the seat 4, a further threaded fixing area 5, having an increased diameter to accomodate the threaded fixing ring nut 6, as well as the pipe 2. An area 7, with an essentially convex truncated-cone cross-section extends from the base of the threaded seat 5, which connects up with the sealing seat 4.

A sealing ring 8, made up of elastomeric material, is positioned within this area 7; the pipe 2 has an annular projection 9 which in the fixing phase, acts like a compression ring on the sealing ring 8.

The pipe 2 on its end, downstream of the said annular projection 9, has a cupped, or swollen shape, almost semi-cylindrical 10 with a hemispherical upper section.

This cupped, or swollen portion 10, in the assembly phase finds a complementary seat 11 within the sealing seat 4 and partially in the truncated-cone area 7.

The operation of the pipe-flange coupling of this invention is as follows: After having introduced the ring nut 6 onto the pipe 2, and introduced the pipe into the hole of the flange 1, so as to set the seats 10 and 11 with one another, the ring nut 6 is screwed onto the threaded seat 5. The ring nut 6, by advancing, pushes and compresses the sealing ring 8 into the area 7, via the compression ring 9, until the ring 9 stops up against the area 7. In this way and also thanks to the enlargement 10, fixed inside the complementary seat 11, the pipe is prevented from rotating. The ring nut will never be subjected to a rotational stress and will be kept in axial tension by the elastomer ring, thereby ensuring a reliable seal, stable in time, since the vibrations are unable to loosen the coupling in any way.

What I claim is:

1. A leak-proof pipe-flange coupling capable of withstanding vibrations at any frequency, which comprises a flange (1) with a threaded through-hole within the upper portion (5) thereof, a pipe (2) inserted in said through-hole, a threaded fixing ring nut (6) inserted on said pipe adapted to be screwed in the threaded portion (5), said through-hole, in the part opposite the threaded portion (5), having a sealing portion (4) of a diameter equal to the outside diameter of said pipe (2), an intermediate area (7) having a truncated-cone section which couples said threaded portion (5) with the sealing portion (4), and a sealing ring (8), made of elastomeric material, inserted in said truncated-cone section (7), said pipe (2) having an annular projection (9), which in the assembly phase is pushed by the ring nut (6) towards the narrower part of said truncated-cone area (7) whereby it acts as a compression ring on said sealing ring (8) urging said sealing ring into sealing engagement with said pipe and truncated-cone section, wherein said pipe (2) has an enlarged portion of semi-cylindrical shape (10) below said annular projection (9), said flange (1) has a seat (11), said enlarged portion fitting in said seat downstream of said truncated-cone coupling portion thereby preventing relative rotation between said pipe and flange.

* * * * *